Dec. 11, 1962  K. WILFERT  3,068,044
SAFETY ARRANGEMENT, PARTICULARLY FOR MOTOR VEHICLES
Filed June 15, 1959
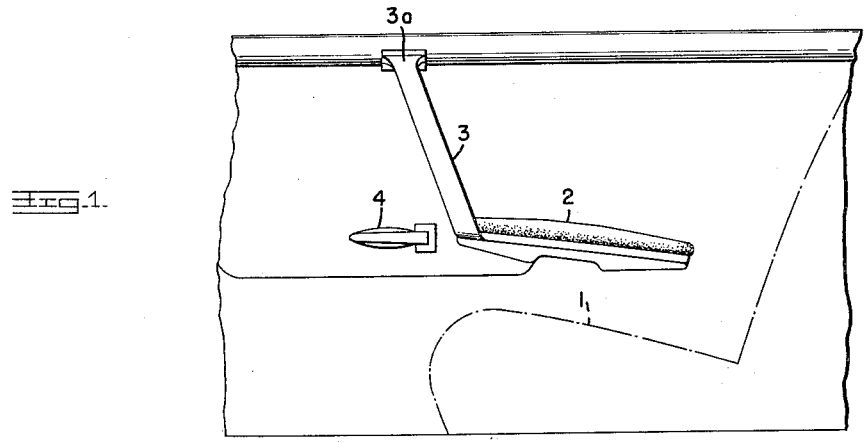
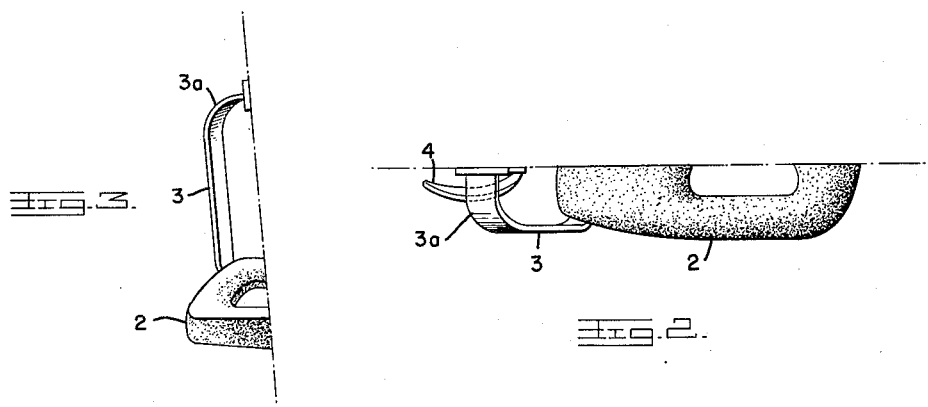
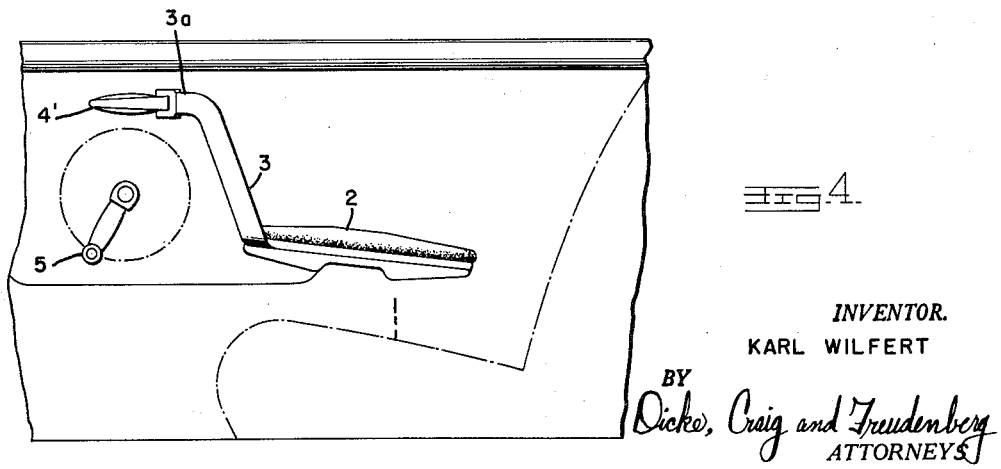
INVENTOR.
KARL WILFERT
BY
Dicke, Craig and Freudenberg
ATTORNEYS

United States Patent Office 3,068,044
Patented Dec. 11, 1962

3,068,044
SAFETY ARRANGEMENT, PARTICULARLY FOR MOTOR VEHICLES
Karl Wilfert, Stuttgart-Degerloch, Germany, assignor to Daimler-Benz Aktiengesellschaft, Stuttgart-Unterturkheim, Germany
Filed June 15, 1959, Ser. No. 820,380
Claims priority, application Germany June 19, 1958
3 Claims. (Cl. 296—44)

The present invention relates to an arrangement in motor vehicles for increasing the safety of the passengers thereof, and more particularly relates to a handle and arrangement of the door opening means in relation thereto along the inside of the door in passenger motor vehicles.

When the vehicle brakes are suddenly applied, it happens oftentimes that a passenger of the vehicle subconsciously reaches forward in the attempt to obtain a firm grip and good hold at a vehicle part disposed in front thereof. It may thereby happen that the passenger seated along side the vehicle door inadvertently seizes the door opening member such as the door handle or door-opening push-button member whereupon the door opens and the greatest accident danger to the life of the passenger nearest the door results therefrom.

These dangers are to be avoided in accordance with the present invention by a particularly suitable safety arrangement which essentially consists in the provision of an essentially closed bow-shaped handle member extending substantially vertically which is arranged in front of the seat at the door and/or ahead of the inner door opening member or door actuating device, especially at the forward end of the arm rest provided along the inside of the door.

If the passenger seated next to the door is unexpectedly thrown forwardly, then it may be expected that the passenger will unintentionally lunge for and get a hold of this handle member and thereby does not inadvertently grab the door-opening member or door actuating device.

Furthermore, the bow-shaped handle member also contributes to the convenience and comfort of the passenger because the person seated next to the bow-shaped handle member may place his or her arm into this bow-shaped handle member and may thereby also get a better hold while the car passes through a curve.

Moreover, the closed bow-shaped member, as contrasted to the conventional window actuating member or door opening member which is not closed upon itself and consequently forms proturberances and projections, effectively prevents the passenger's clothes or luggage pieces or similar objects being struck or caught by the door-opening device or window actuating member such as the hand crank for the window actuating arrangement.

Accordingly, it is an object of the present invention to provide an arrangement for the passengers of a passenger motor vehicle which greatly increases the safety of the passengers, especially in case the brakes are suddenly applied.

It is another object of the present invention to provide an arrangement of a safety handle which is so arranged as to prevent or minimize the danger of inadvertent opening of the door when the passenger, in case of danger, subconsciously attempts to get a hold of an object against which the passenger may brace himself.

A still further object of the present invention is the arrangement and provision of such a handle member which will obstruct as little as possible the movement of luggage pieces or brief cases into and out of the vehicle and which at the same time minimizes the danger of clothes or garments getting hung-up on the handle member.

These and other objects, features and advantages of the present invention will become more obvious from the following description when taken in connection with the accompanying drawing which shows, for purposes of illustration only, two embodiments in accordance with the present invention and wherein:

FIGURE 1 is a partial elevational view of the inside of the door portion of a motor vehicle provided with an arm rest, FIGURE 2 is a top plan view of the holding or handle member and arm rest arrangement shown in FIGURE 1, FIGURE 3 is a rear elevational view of the handle member and arm rest arrangement according to FIGURE 1, and FIGURE 4 is a partial elevational view of a modified embodiment of the inside of the door portion of a motor vehicle door in accordance with the present invention.

Referring now to the drawings, wherein like reference numerals are used throughout the various views to designate like parts, and more particularly to FIGURE 1 thereof, reference numeral 1 designates a seat of the passenger motor vehicle which may be of any suitable conventional construction. An arm rest 2 of any appropriate shape and construction, especially an upholstered or padded arm rest 2 which may be constructed itself either as handle or in which a container adapted to be closed by a lid may be accommodated is arranged within the area of the seat 1.

According to the present invention, a stationary bow-shaped handle member or safety bar 3 extends upwardly from the forward end of the arm rest 2. The bow-shaped handle member 3 is slightly inclined upwardly forwardly, extends over a major part thereof approximately parallel to the inner wall of the door and the upper end 3a thereof is again bent back in the direction toward the door. Consequently, as may be readily seen from FIGURE 3, the bow-shaped handle member 3 leaves a gap between itself and the wall of the door which corresponds in width approximately to the width of the arm rest 2.

If a window, which may be either of the stationary type, i.e., of the type which cannot be opened, or of the type to be displaced, for example by displacement in a horizontal direction, is arranged above the arm rest 2, then the door opening member 4, for example, a pivotal door actuating handle, may be arranged in front of the arm rest 2 as is shown in FIGURE 1. Consequently, the door opening member 4 is not likely to be seized by the passenger in case of danger.

If, however, a window-actuating crank 5 is provided within this region as shown in FIGURE 4, then the door opening device such as handle 4' is arranged above the circle through which the door opening crank 5 is rotated as is also shown in FIGURE 4. In that case, the pivotal support of the door handle 4' may be combined structurally with the upper end 3a of the bow-shaped handle member 3 as illustrated in FIGURE 4. In the embodiment according to FIGURE 4, the door opening device 4' again is arranged and protected or shielded by the bow-shaped member 3.

The bow-shaped member 3 may be constructed as a rigid bow-shaped member, for example, of metal, wood or plastic and may possibly also be provided with a padding cover. However, the bow-shaped member 3 may also be made of elastic or flexible material, for example, of a thick leather belt, a thick semi-rigid rope, or the like.

While I have shown and described two embodiments in accordance with the present invention, it is understood that the same may be modified in many ways within the spirit and scope of the present invention. The particular configuration of the gripping member 3 as well as the material used in connection therewith may be varied at will in accordance with the present invention. Moreover, the arrangement of the various parts arranged alongside the inner wall of the door may be varied in accordance with the spirit and scope of the present invention as long as the basic concept is retained that the door opening device is effectively shielded or protected by holding or handle member in such a way that the door opening device is disposed in front thereof as viewed in the direction of travel.

Thus, it is seen that the present invention is susceptible of many changes and modifications within the spirit and scope of the present invention, and I, therefore, do not wish to be limited to the specific details described and illustrated herein but intend to cover all such changes and modifications as are encompassed by the scope of the appended claims.

I claim:

1. A safety arrangement for motor vehicles having an inner vehicle wall, a door adapted to be opened and forming at least a portion of said wall, door actuating means disposed along the inside of said wall, and closed, stationary bow-shaped handle means extending in the upward direction along the inside of said wall, said door actuating means being arranged essentially in front of said handle means and on substantially the same horizontal level as part of said handle means and being effectively protected thereby from inadvertent contact by a passenger.

2. A safety arrangement for motor vehicles according to claim 1, wherein said stationary handle means is constructed as an essentially rigid bow-shaped member provided with padding.

3. A safety arrangement for protecting an occupant of a motor vehicle having an inner vehicle wall, a door adapted to be opened and forming at least part of said wall, door actuating means disposed along the inside of said wall, a bow-shaped safety bar secured at its ends to said wall and being otherwise spaced from said wall and extending substantially upwardly, said safety bar being positioned closely adjacent and rearwardly of said door actuating means to protect said occupant from inadvertently contacting said door actuating means, said safety bar being adapted to be grasped by an occupant, and arm rest means positioned substantially between said safety bar and the normal seated position of an occupant.

References Cited in the file of this patent

UNITED STATES PATENTS

| | | |
|---|---|---|
| 1,247,996 | Parker | Nov. 27, 1917 |
| 1,996,480 | Menton | Apr. 2, 1935 |
| 2,038,062 | Simpson | Apr. 2, 1936 |
| 2,077,140 | Brantingson | Apr. 13, 1937 |
| 2,080,433 | Morrison | May 18, 1937 |
| 2,537,380 | Travis | Jan. 9, 1951 |
| 2,578,547 | Hilger | Dec. 11, 1951 |
| 2,661,052 | Bushong | Dec. 1, 1953 |
| 2,674,486 | Alderfer | Apr. 6, 1954 |